July 28, 1959
A. J. LUSCOMBE
2,896,923
PORTABLE FEED MIXER
Filed May 25, 1956
2 Sheets-Sheet 2
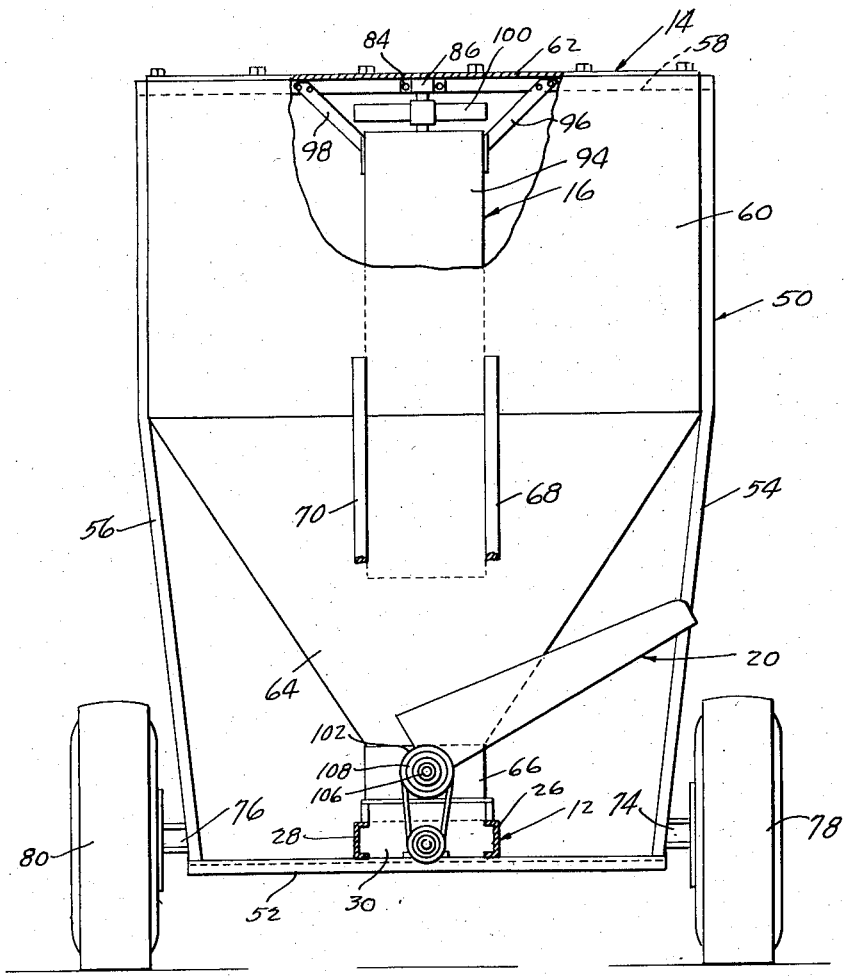
INVENTOR.
ARTHUR J. LUSCOMBE,
BY
McMorrow, Berman & Davidson
ATTORNEYS.

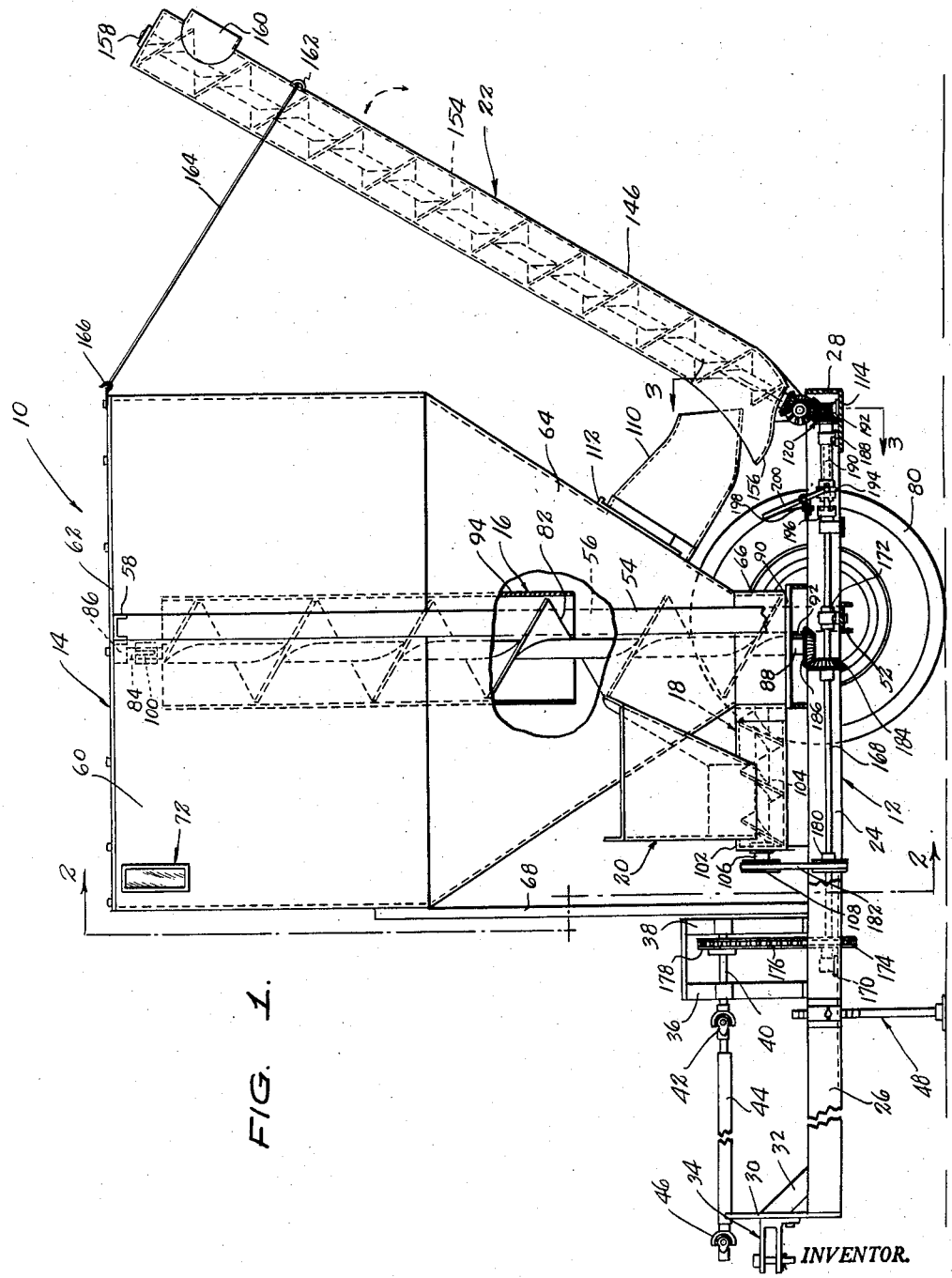

United States Patent Office 2,896,923
Patented July 28, 1959

2,896,923

PORTABLE FEED MIXER

Arthur J. Luscombe, Dolliver, Iowa

Application May 25, 1956, Serial No. 587,252

2 Claims. (Cl. 259—8)

This invention relates generally to mixing apparatus for feed, grains, fodder, forage, cereals, and the like, and is more particularly concerned with a novel portable feed mixer.

A primary object of invention is to provide novel portable feed mixing apparatus including a mobile support frame including thereon hitch means and drive shaft means respectively connectible to hitch and power take-off means of a draft vehicle, the support frame including thereon a vertically disposed hopper closed at its upper and lower ends and including a lower converging end portion, a recirculating mixer auger assembly in the hopper extending between the upper and lower end portions thereof, a feed auger assembly extending between an input chute and the hopper adjacent a lower end portion of the recirculating mixer auger assembly, a controlled discharge chute between a lower portion of the hopper and a vertically extending dispensing auger assembly, and means extending between the auger assemblies and the drive shaft means of the mixing apparatus drivingly connecting the auger assemblies to the drive shaft means.

A further object of invention in conformance with that set forth is to provide a novel portable feed mixer of the character involved which is readily and economically manufactured, easily used and maintained, and highly satisfactory, serviceable and efficient for the purpose intended.

These together with other objects and advantages which will become subsequently apparent reside in the details of construction and operation as more fully hereinafter described and claimed, reference being had to the accompanying drawing forming a part hereof wherein like numerals refer to like parts throughout, and in which:

Figure 1 is a side elevational view of the novel mixing apparatus, with portions broken away and shown in section for clarity;

Figure 2 is a vertical sectional view taken substantially on line 2—2 of Figure 1, with portions broken away for clarity; and Figure 3 is an enlarged sectional view taken substantially on line 3—3 of Figure 1.

Referring to the drawing in detail, the novel mixing apparatus is indicated generally at 10, including a mobile or vehicular support frame 12, a mixing hopper 14, the mixing hopper incorporating therein a vertically extending recirculating mixer auger assembly 16 fed by a feeder auger assembly 18 receiving material from an input chute 20, the mixed material being discharged from the hopper to a dispensing auger assembly indicated generally at 22.

The support frame 12 includes a pair of side frame elements 24 and 26 connected by a rear transverse member 28, the side frame elements 24 and 26 converging at their forward ends and being secured to a suitable vertically extending support plate 30. The support plate 30 is suitably braced at 32 and has extending forwardly therefrom and secured in any suitable manner thereto a hitch connection assembly 34 which may be suitably connected to cooperating draft hitch structure of a draft vehicle (not shown). The side frame elements 24 and 26 have extending vertically in spaced relationship from forward intermediate portions thereof support elements 36 and 38 which have journaled thereon a horizontally disposed driven shaft 40, the forward end portion of which is connected by means of a suitable universal joint structure 42 to a shaft member 44 which is supported on the support plate 30, and which includes on its forward end a suitable universal joint 46 connectible to the power take-off of a draft vehicle. Depending from a forward portion between the side frame elements 24 and 26 is a vertically adjustable leg assembly indicated generally at 48, affording means for storing or parking the mixing apparatus when detached from a draft vehicle.

A support frame for the hopper 14 is indicated generally at 50, said support frame including a lower channel member 52 suitably secured beneath the frame elements 24 and 26 at opposite intermediate portions thereof, opposite ends of the channel member 52 being suitably secured to upwardly extending side frame members 54 and 56, see Figure 2, which in turn, are connected at their upper ends to an upper transverse channel member 58.

The hopper 14 includes an upper cylindrical portion 60 having suitably secured on its upper end a cover plate member 62, said cylindrical portion 60 terminating in a conical portion 64 which concludes in a cylindrical collar portion 66 suitably secured on the support frame 12. Upper end portions of side portions 54 and 56 of the frame 50 are suitably secured on opposite sides of the cylindrical portion 60 of the hopper. It will be noted that the top channel member 58 of the support frame 50 extends through the hopper 14 in underlying relationship relative to the cover 62 of said hopper. Suitable vertically extending brace elements 68 and 70 may be secured between the side frame elements 24 and 26 of the frame 12 and the cylindrical portion 60 of the hopper. For the purpose of observing when the hopper 14 is filled, a suitable observation window 72 may be disposed in the cylindrical portion 60 of the hopper 14.

Extending laterally from lower end portions of the side frame members 54 and 56 of the support frame 50 are suitably secured stub shafts 74 and 76, respectively, upon which are suitably journaled support wheels 78 and 80, respectively.

The recirculating mixer auger assembly 16 is constituted by an elongated helical feed or auger screw member 82 which includes an upper shaft portion 84 journaled in a suitable bearing 86 suitably secured to a medial portion of the upper support frame member 58 which extends through the hopper 14. The lower end portion of the auger or feed screw 82 terminates in a shaft 88 extending through a bottom member 90 closing the bottom of the hopper, said shaft 88 having secured thereon a beveled gear element 92 providing means wherein the screw 82 will be driven. Circumposed about the upper end portion of the helical screw 82 is a tubular sleeve member 94 having secured on opposite sides of its upper end portion lower ends of support straps 96 and 98 which are suitably secured at their upper ends in spaced relationship to intermediate portions of the channel member 58 of the previously mentioned support frame 50. Thus, when material is deposited in the lower portion of the hopper 14 and after it has accumulated therein, it is carried by the helical screw 82 upwardly through the tubular sleeve 94 subsequently passing over the upper end and descending over the outside of the sleeve 94. To facilitate the breaking up or mixing of the material moved by the helical screw 82 a transverse blade member 100 is suitably secured on the shaft 84 of the helical screw adjacent the upper end of the tubular sleeve 94.

The feeder auger assembly 18 comprises a cylindrical housing 102 which is suitably supported on the support frame 12 between the frame elements 24 and 26, said housing 102 communicating with the lower cylindrical portion 66 of the hopper 14. Suitably journaled within the housing 102 is a helical feed screw 104 which terminates in a shaft end portion 106 extending out of the housing 102 and having secured thereto a pulley element 108, see Figure 1. The housing 102 includes an opening in the upper side thereof through which the input chute 20 directly communicates, the various materials to be mixed in the mixing apparatus being directly fed into the input chute 20. The lower conical portion 64 of the hopper 14 has extending rearwardly therefrom a suitable discharge conduit 110, and extending transversely thereacross is a slidable gate member 112 which may be lowered to prevent the discharge of mixed material through the conduit 110 when lowered, and when raised, will permit the material to be moved through the conduit 110.

The frame elements 24 and 26 have secured therebeneath at the rear end thereof a transverse support plate 114, said plate being transversely apertured as seen at 116, and having extending therethrough a support shaft 118 which has secured on the upper end thereof in any suitable manner a gear member 120 which includes a downwardly tapered beveled gear portion 122 and an upwardly beveled gear portion 124, these beveled gear portions being constructed as an integral piece. A transversely apertured bight portion 126 of a support yoke, indicated generally at 128, see Figure 3, has a tubular support sleeve 130 extending therethrough, said sleeve being circumposed about an intermediate portion of the support shaft 118 and being integral with the bight portion 126 of the yoke. The yoke 128 includes vertically extending support arms 132 and 134 which terminate at their upper ends in boss portions 136 and 138, respectively, which have extending transversely therethrough a support shaft 140. Pivotally supported on the support shaft 140 are a pair of support arm elements 142 and 144 which are disposed adjacent the boss portions 136 and 138, respectively, at their lower ends, the upper ends of which being suitably secured, by means of welding, for example, to the opposite outer lower surface portions of a tubular housing 146 of the dispensing auger assembly 22. The support shaft has suitably secured thereon a beveled gear element 148 interengaged with the beveled gear element 124 of the gear 120 previously mentioned. The support shaft 140 defines a horizontal pivot axis for the dispensing auger assembly 122. The housing 146 includes a lower transverse end portion 150 which has extending therethrough a shaft portion 152 of a helical conveying screw 154 which extends the length of the housing 146, thus providing means for elevating the mixed material discharged from the conduit 110. The shaft 152 has secured on its lower end in any suitable manner, a beveled gear element 155 interengaged with the beveled gear element 148. The housing 146 includes an enlarged lower receiving portion 156 and an opening underlying the lower discharge end of the conduit 110 for receiving such mixed material. The upper end of the conveying screw 154 is suitably journaled at 158 in the upper end of the housing 146. The housing 146 includes at its upper end a suitable discharge portion 160 communicating with the interior thereof. The support shaft 118 provides a vertical pivot axis for the dispensing auger assembly 22, and as previously mentioned, the support shaft 140 provides a horizontal pivot axis.

In order to support the auger dispensing assembly 22 in various positions of vertical pivotal adjustment there is disposed about an intermediate portion thereof through a suitable integral loop element 162 a flexible cable 164 which is suitably secured to a hook element 166 at the top of the rear edge of the hopper 14.

The frame elements 24 and 26 have extending longitudinally therebetween a suitably supported power take-off shaft member 168 supported in suitable bearing elements 170 and 172. The shaft 168 has secured on a forward end portion thereof an integral sprocket wheel 174 which has journaled thereabout a drive chain 176, said chain being journaled about a driving sprocket 178 integrally secured on the previously mentioned shaft 40. Secured on an intermediate portion of the power take-off shaft 168 is a drive pulley 180 which has journaled thereabout a flexible belt 182 extending over the pulley 108 connected to the shaft 106 of the feeder auger assembly 18. Integrally secured to a rearwardly disposed intermediate portion of the power take-off shaft 168 is a beveled gear element 184 interengaged with the beveled gear element 186 secured to the shaft portion 88 of the helical screw 82. Thus, as the power take-off shaft 168 is driven by the power take-off of the draft vehicle, the feed screw of the feeder auger assembly 18 and the mixing screw 82 of the recirculating mixing auger assembly 16 are rotated and perform the functions previously mentioned. After the material which has been fed into the hopper 14 has been sufficiently mixed and attained the level which is apparent through the observation window 72, the gate 112 may be raised for permitting the mixed material to be discharged through the conduit 110. As the mixed material is being discharged, the mixer screw 82 will be effective to urge the mixed material out of the discharge conduit 110.

Extending upwardly from the support plate 114 rearwardly of the gear 120 is a bearing block 188 which rotatably supports therein a longitudinally extending shaft 190 which has secured on the rear end thereof a beveled gear element 192 interengaged with the lower beveled gear portion 122 of the gear 120. The shaft 190 may have an externally splined outer surface portion on which a reciprocable clutch element 194 is disposed, said clutch element 194 being engageable with a cooperating clutch element 196 integral with the rear end portion of the power take-off shaft 168. Extending transversely across the frame elements 24 and 26 is a support plate 198 which has pivotally mounted thereon an intermediately pivoted clutch lever 200 engageable at its lower end with the clutch element 194 for moving the same forwardly or rearwardly into or out of engagement with the clutch element 196. Thus, when the mixed material is discharged from the conduit 110, the clutch elements 194 and 196 may be engaged whereafter the feed screw 154 of the dispensing auger assembly is operated to raise the mixed material for subsequently dispensing the same out of the discharge portion 160.

Thus there has been disclosed a novel portable feed mixer which fully conforms with the objects of invention heretofore set forth.

Various positional and directional terms, such as "forward," "rear," etc., are utilized herein to have only relative connotation to aid in describing the device and it is not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. A portable feed mixer comprising a mobile support frame, hitch means on a forward end portion of the support frame for securement to a draft vehicle, drive shaft means journalled on the support frame and including means for connection to the power take-off of the draft vehicle, a mixing hopper secured in vertically extending relationship from the support frame and including a closed top portion and converging closed lower end portion, a vertically disposed recirculating mixer auger assembly journalled centrally within the hopper between the lower and upper end portions thereof, means drivingly connecting the mixer auger assembly to the drive shaft for driving the same and recirculating material mixed in the hopper, said material ascending centrally through the mixer auger assembly and descending externally thereof, a lateral feed auger assembly communicating at one end with the lower end portion of the hopper adjacent a lower end portion of the mixer auger assembly, an input chute member in communication with the other end of the feed auger assembly for depositing feed material therein, means drivingly connecting the feed auger assembly to the drive shaft, a discharge chute in communication at one end with the converging lower end portion of the hopper for receiving the mixed material from the hopper, means for controlling the flow of mixed material from the hopper to the discharge chute, a vertically disposed dispensing auger assembly extending vertically from the support frame and including a lower end portion communicating with the other end of the discharge chute, power transfer means drivingly connecting the dispensing auger assembly to the drive shaft for elevating the material received from the discharge chute, the dispensing auger assembly including a discharge nozzle portion at the upper end thereof, the power transfer means including means for permitting the dispensing auger assembly to be horizontally and vertically pivoted, and clutch means interposed between the drive shaft and dispensing auger assembly, permitting the mixer and feed auger assemblies to be driven independently of the dispensing auger assembly, or simultaneously with the dispensing auger assembly when material is discharged therein.

2. In a grain mixing machine that has a mobile frame adapted to be connected to a draft vehicle, said frame supporting a drive shaft adapted to be connected to a power take-off of the drive vehicle and supporting a longitudinal approximately horizontally disposed conveyor, a mixing body having tapered side walls which are funnelled downwardly and inwardly, one of said side walls at the lower portion thereof having an inlet in registry with said conveyor, a mixing auger disposed approximately vertically in said mixing body and having a generally vertical axis of rotation, means drivingly connecting the mixing auger to the drive shaft, a mixing auger casing in which said mixing auger is disposed, said casing having an inlet at the lower end thereof and located in the tapered wall part of said body to accept grain from the lower part of said mixing body and transported upwardly in said body, said auger casing having an outlet near the top thereof to spill the grain into the top portion of said mixing body where it falls by gravity into the lower portion, so that the grain is continuously circulated in said mixing body in response to rotation of said mixing auger, and outlet means connected with the lower portion of said mixing body for the withdrawal of grain therefrom, a housing communicated with the outlet means, an unloading auger operably mounted in said housing, power transfer means drivingly connecting the unloading auger to the drive shaft, said power transfer means including means for permitting the unloading auger and housing to be horizontally and vertically pivoted, and clutch means interposed between the drive shaft and unloading auger, permitting the mixing auger to be driven independently of the unloading auger or simultaneously with the unloading auger when material is discharged thereby from the mixing body.

References Cited in the file of this patent

UNITED STATES PATENTS

| | | |
|---|---|---|
| 1,351,725 | Mosby | Aug. 31, 1920 |
| 1,381,328 | Morrissey | June 14, 1921 |
| 1,720,360 | Haines | July 9, 1929 |
| 2,074,988 | O'Brien et al. | Mar. 23, 1937 |
| 2,281,974 | Herr | May 5, 1942 |
| 2,438,301 | Schulte | Mar. 23, 1948 |
| 2,731,248 | Fisher | Jan. 17, 1956 |
| 2,767,963 | Ringen et al. | Oct. 23, 1956 |
| 2,815,941 | Schmale | Dec. 10, 1957 |